Patented Aug. 26, 1941

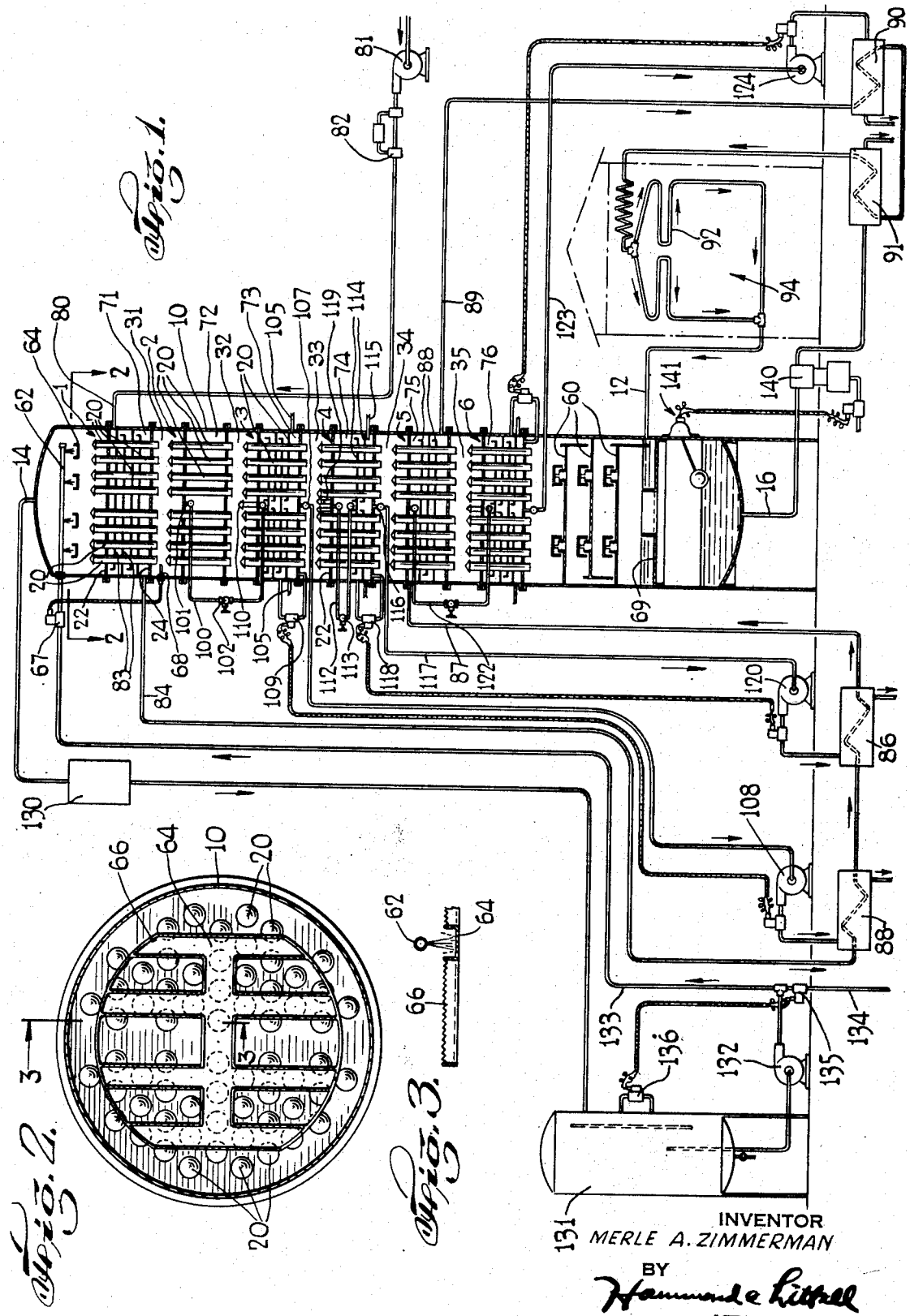

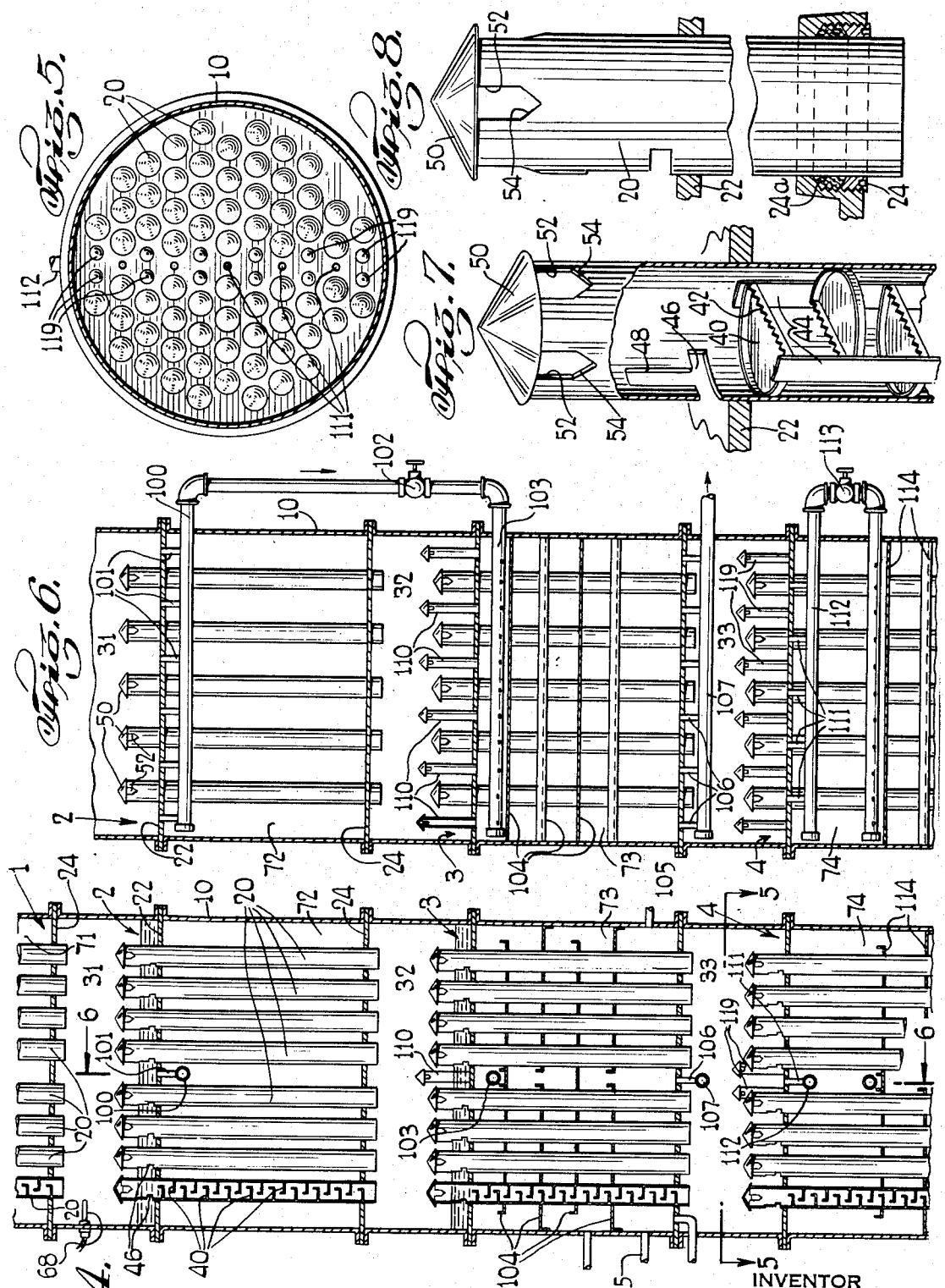

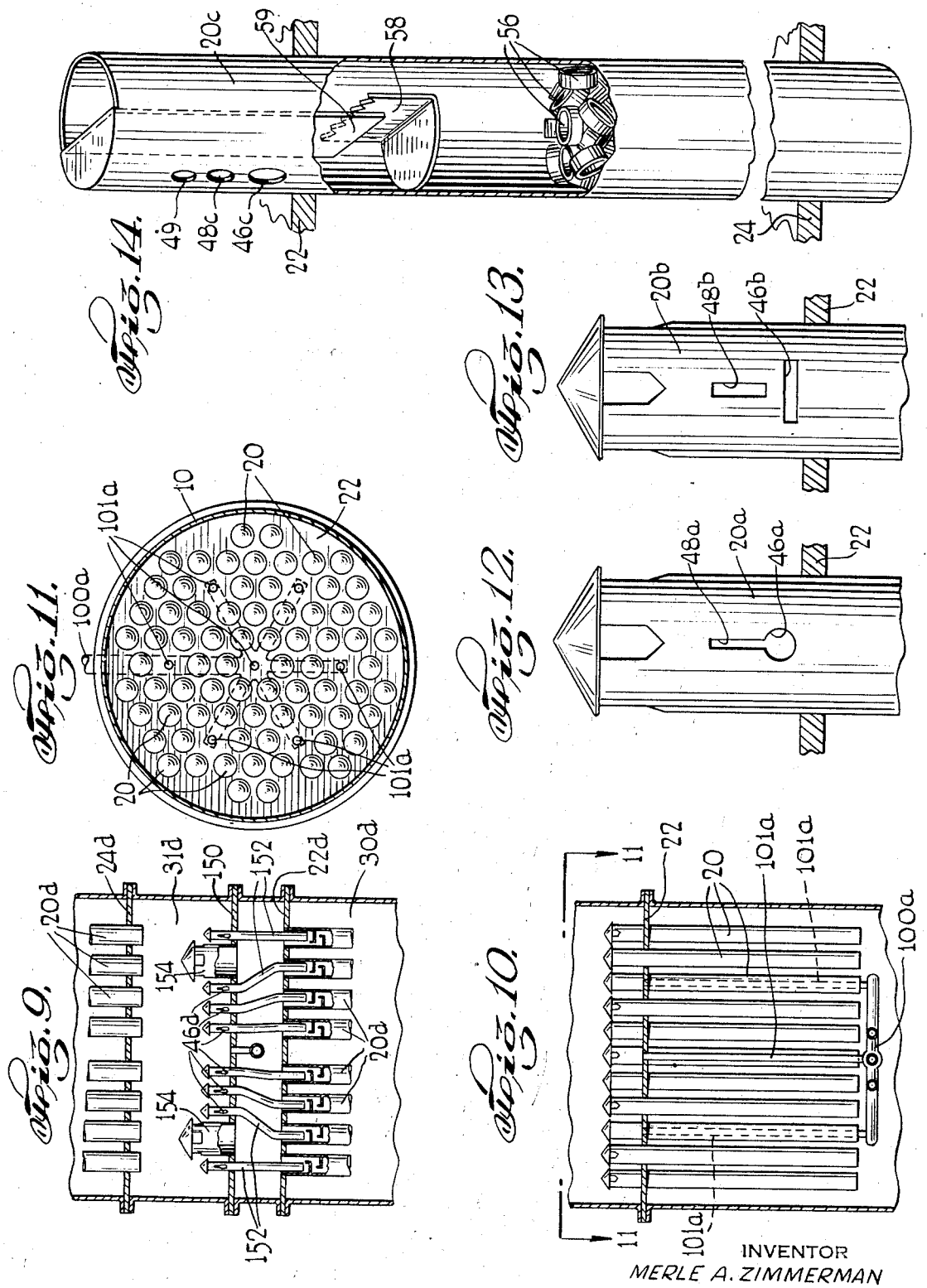

2,253,925

UNITED STATES PATENT OFFICE 2,253,925

METHOD AND APPARATUS FOR RECTIFICATION, ABSORPTION, AND GAS SCRUBBING

Merle A. Zimmerman, New York, N. Y.

Application December 20, 1939, Serial No. 310,136

15 Claims. (Cl. 261—112)

This invention relates to new and useful improvements in methods and apparatus for effecting intimate countercurrent contact between vapors and liquids and for carrying out other allied operations in processes of rectification, absorption and gas scrubbing.

The fractional distillation of mineral oils, for example, is usually performed by means of a conventional bubble tower, in which vapors rise from the bottom to the top of the tower through a number of bubble decks, while reflux liquid formed by condensation of vapors descends and comes into intimate contact with the rising vapors at each bubble deck. The bubble decks in a tower of this sort are usually located about two feet apart. The fractionating efficiency of each bubble deck is approximately 50%, so that about two decks, or about four feet of tower height, are required to produce the effect of one redistillation on the composition of the rising vapors. The diameter of the conventional bubble tower is limited by several factors, the most important of which is the allowable vapor velocity through the risers or through the slots in the bubble decks. Since the free area of the risers in a conventional bubble tray having round risers varies between about 8% and 14% of the cross sectional area of the tower, and since the free area through a bubble tray having slotted caps is considerably less than the riser area, it will be apparent that a bubble tower not only must be large in height but also must have a substantial diameter in order to produce the desired results and keep the vapors at a satisfactorily low velocity for given operating conditions. These factors make it necessary to use large and costly equipment for carrying out a given job, with resulting limitations on the efficiency of the operations.

When the conventional bubble tower is used for fractional distillation work involving the withdrawal and stripping of side streams to remove light ends as vapor and produce desirable intermediate products, it is necessary to provide auxiliary stripping towers for this purpose, sometimes in conjunction with reboilers. When the volume of rising vapors needs to be reduced at some point in the tower it is necessary to provide intermediate reflux condensers. When conventional bubble towers are used for gas absorption, external cooling must be provided in order to maintain the proper operating temperatures. These and other circumstances increase the cost and bulk of the equipment installation, while also placing limitations on its operating efficiency.

An object of the present invention is to provide new and improved methods and apparatus for rectification, absorption and gas scrubbing which are characterized by reduced cost and increased operating efficiency as compared with the systems heretofore used for such purposes. By the use of this invention, a given job can be carried out with apparatus of much smaller size than in the past, or greater thru-puts can be obtained from an installation of given size.

Another object of my invention is to provide methods and apparatus for rectification, absorption and gas scrubbing which increase operating efficiency and reduce costs of operation by reducing or eliminating the need for side stream stripping towers, reboilers, intermediate reflux condensers, external coolers, etc., the operations heretofore performed by the use of such auxiliary apparatus being carried out according to the present invention as integral parts of the contact tower operation.

Another object of my invention is to provide a new type of apparatus for the countercurrent contacting of vapors and liquids, as in rectification, absorption and gas scrubbing; more particularly, to provide a new type of tower construction comprising a plurality of vapor and liquid contact sections, each adapted to effect intimate contact between a multiplicity of small streams of rising vapors and a multiplicity of small streams of down-flowing liquid; to provide new types and arrangements of contact tubes for use in such contact sections; to provide novel means for distributing reflux liquid uniformly into the multiplicity of contact tubes comprised in each contact section; and to provide novel means for effecting the reboiling and stripping of liquid side streams and the production of improved liquid intermediate products as an integral part of the operation of a contact or rectification tower.

These and other objects and advantages of my invention and its various novel contributions to the art will become apparent from the following description.

In accordance with a principal feature of the present invention, processes of rectification, absorption and gas scrubbing are carried out by employing a new type of contact tower construction, admitting vapors into the tower in a main stream, repeatedly distributing the vapor stream into a multiplicity of substantially equal rising vapor streams, repeatedly distributing a body of liquid in the tower into a multiplicity of substantially equal down-flowing liquid streams, and countercurrently contacting each of the many rising vapor streams, after each stage of distribution, with one of the many down-flowing liquid streams to effect an intimate contact or scrubbing action. After passing through each contact stage the many individual streams of vapors and liquid are joined together in tower chambers into common bodies of vapor and liquid that are again distributed into a multiplicity of individual streams before entering another contact stage. The several collected bodies of liquid are so controlled as to enable ready removal of liquid side streams from the tower without unbalancing the tower operation or preventing proper redistribution of the residual liquid into small streams for contact with rising vapor streams in the succeeding stage of the tower operation. Furthermore, the tower construction is such, and the flow of the vapors and liquids is so controlled, that heat may be readily abstracted from or supplied to the vapors and liquid passing through any one or all of the contact sections, so that the tower operation not only is carried out with greatly increased efficiency, as compared with the conventional bubble tower, but also includes as an integral part of the operation certain treatments which are closely allied to the main work of the tower but which have heretofore required the use of special auxiliary equipment for efficient performance.

Each tower chamber lying between adjacent contact sections is supplied with means for maintaining a pool of the liquid therein and with means for effecting a continuous and substantially uniform distribution of the liquid from the pool into the contact tubes of the underlying contact section. Adjacent the bottom of the tower means are provided for admitting a main stream of charge material into the system, as well as means for withdrawing a liquid bottom product from the tower. Means also are provided adjacent the top of the tower for introducing a stream of scrubbing or reflux liquid into the tower, together with means for distributing the liquid into a pool of substantially uniform depth from which a multiplicity of substantially equal small down-flowing streams may be distributed into the contact tubes of the uppermost contact section. The contact tubes of each contact section may be so constructed that an exceedingly thorough scrubbing or fractionating action is produced on the individual streams of vapor and liquid which pass through each tube. The efficiency of the entire tower exceeds that of conventional bubble towers to such an extent that the former may be much smaller in size and yet will perform the same amount of work. Furthermore, the new tower construction provided by this invention, at least in some cases, permits the diameter of the tower to be substantially less than that of the conventional bubble tower without sacrificing efficiency or working capacity.

As already mentioned, one of the features of the invention is that it enables the withdrawal of liquid intermediate products of sharply defined qualities from the tower at any desired stage, and without adversely affecting the tower operation. For this purpose suitable means are provided in communication with the body or pool of liquid held in any selected tower chamber between two adjacent contact sections.

Another important feature of the invention is that one or more heat exchange operations may be carried out as an integral part of the tower operation by utilizing for heat exchange space between the tower shell and the external surfaces of the contact tubes of selected contact sections. Each of such heat exchange compartments is separated from the adjacent tower chambers by means of suitable sealing plates or partitions which extend across the tower intermediate the ends of the contact tubes, and means are provided in communication with each compartment for introducing and withdrawing liquid or vapors or both to abstract heat from or supply heat to the surfaces of the contact tubes. By reason of this construction, the new apparatus constitutes an efficient means for pre-heating the material to be charged into the tower; for reboiling bottom products, as in the case of a gasoline stabilizer; for heating or cooling any sections of the tower to obtain improved fractionation; for reducing the volume of rising vapors at a selected point in the tower (heretofore accomplished by the use of intermediate reflux condensers); or for heating or cooling portions of the tower when the tower is being used for gas absorption. Thus it becomes possible to reduce or eliminate a large part of the auxiliary equipment which has been necessary heretofore for such purposes.

An especially important feature of the invention, as applied to rectification processes, is that it enables the production of improved liquid intermediate products as an integral part of the tower operation. According to this phase of the invention, a side stream of liquid is withdrawn from a pool of the liquid at any desired stage of the tower operation. The side stream is introduced into one of the above mentioned heat exchange compartments located below the liquid pool (and therefore enclosing contact tubes subject to higher temperatures), and light ends are removed from the side stream liquid by reboiling the liquid by heat exchange from the external surfaces of the contact tubes. This reboiling may be carried out in the presence of a stripping medium, such as steam or other high vapor pressure material, which may be introduced into the heat exchange or stripping compartment by suitable supply means. The liquid stream, after having been subjected to the heating and stripping treatments, is continuously withdrawn from the compartment as an intermediate product of improved quality. The vapors boiled or stripped from the side stream are preferably vented into the tower chamber between the stripping section and the contact section next above, where they mingle with the main body of vapors rising through the tower. Thus the production of intermediate products of high quality is carried out with the utmost thermal and operating efficiency, but without adversely affecting the main rectification process or requiring the use of side stream stripping towers, reboilers or other special devices.

An illustrative embodiment of my invention, as applied to the fractional distillation of mineral oils, is described in detail hereinafter, reference being made to the accompanying drawings for illustrations of preferred forms of apparatus embodying the invention. It will be understood that my invention is not restricted to details of the illustrative embodiments, since it obviously contemplates various other embodiments employing the novel features set forth in the appended claims.

In the drawings, Figure 1 shows diagrammatically an assembly of apparatus embodying the invention, the rectifying tower being shown in vertical section.

Figure 2 is a horizontal section adjacent the top of the tower, along line 2—2 of Figure 1, showing one form of distributing device for distributing external reflux liquid to the feed plate of the uppermost contact section.

Figure 3 is a vertical section along 3—3 of Figure 2, showing a detail of the distributing device.

Figure 4 is an enlarged vertical section through a portion of the contact tower.

Figure 5 is a horizontal section taken approximately along line 5—5 of Figure 4.

Figure 6 is another enlarged vertical section showing substantially the same portion of the tower as Figure 4, as viewed substantially along line 6—6 of Figure 4.

Figure 7 is an enlarged perspective view, partly in vertical section, showing one form of construction of the contact tubes.

Figure 8 is a vertical elevation, partly in section, showing an alternative means for mounting the contact tubes in the spaced supporting plates which extend across the tower shell.

Figure 9 is a vertical section illustrating an alternative means for distributing reflux liquid from a tower chamber into the tubes of an underlying contact section.

Figure 10 is a vertical section showing an alternative means for withdrawing a liquid side stream from a pool of liquid maintained in a tower chamber.

Figure 11 is a horizontal section along line 11—11 of Figure 10.

Figures 12 and 13 illustrate alternative constructions for the upper ends of the contact tubes, by which to control the distribution of reflux liquid into the tubes, and Figure 14 is a perspective view, partly in section, showing still another form of contact tube construction.

The assembly of Figure 1 illustrates an application of the present invention to the rectification of mineral oil under atmospheric pressure, the system being one which produces from liquid stock a low boiling top product of sharply defined quality, a high boiling bottom product and several intermediate products having different boiling points which lie between the boiling points of the top and bottom products. The main rectification process and the reboiling and stripping operations which produce intermediate products of improved quality are all carried out as integral parts of the operation of a single rectifying tower 10, which, as shown, is of cylindrical construction. An inlet 12 communicates with the flash zone of the tower to supply charge material. An outlet 14 is provided at the top of the tower for withdrawing vapors constituting the top product. An outlet 16 at the bottom draws off the liquid bottom product. Intermediate the charge inlet 12 and the vapor outlet 14 the tower comprises a plurality of superimposed contact sections 1, 2, 3, 4, 5 and 6. Each contact section includes a multiplicity of parallel vertical contact tubes 20, these tubes being mounted and supported in spaced relation by means of spaced decks or plates 22 and 24, which extend across the tower and are sealed to the tower shell by welding or by suitable joints between cylindrical sections of the shell, substantially as shown. The plates 22 and 24 are sealed to the contact tubes, for example, by fitting or welding the tubes tightly into openings in the plates, or by the use of stuffing boxes such as shown at 24a in Figure 8. The upper end of each contact tube 20 projects above the plate 22, which serves as the liquid feed plate, and the lower end of each contact tube extends at least to, and conveniently beyond, plate 24.

The lower plate 24 of each contact section is arranged in spaced relation to the upper plate 22 of an underlying contact section to provide tower chambers 31, 32, 33, 34 and 35 between the adjacent sections.

A suitable construction of the contact tubes 20 is shown in Figures 4 and 7 of the drawings. As there illustrated, each tube is cylindrical and encloses a vertical series of staggered splash trays or baffles 40, which may be flanged to hold a pool of liquid thereon and provided with serrated lips 42 causing uniform distribution of the liquid from baffle to baffle. The baffles 40 are spaced apart in such manner as not to constrict appreciably the free area for the passage of vapors through the tubes. The series of baffles or trays for each tube may be mounted on common brackets 44 for insertion into the tube as a unit. The contact tubes may have any desired cross-sectional shape, e. g., circular, triangular, square, hexagonal, etc.

It will be noted that the lower ends of the contact tubes 20 of each contact section open into a common underlying tower chamber, so that the body of vapors rising from the chamber is distributed uniformly among the many tubes. The upper ends of the tubes of each contact section are provided with means for maintaining a body or pool of liquid on the feed plate 22 of the corresponding contact section and for distributing the liquid descending from this pool into the many tubes in substantially uniform small streams. For this purpose, the side walls of the tubes may be cut out to form reflux openings 46. These openings are dimensioned in relation to the normal flow rate of the liquid so that they remain at least partly submerged in the pool of liquid held on plate 22, and preferably so that a pool of liquid at least several inches deep is constantly maintained on the feed plate. To take care of varying rates of liquid flow in any section of the tower, the comparatively large submerged openings 46 may be formed with narrower vertical elongations 48 through which liquid is free to pass whenever the pool on plate 22 rises above a normal level.

Alternative constructions of the reflux openings are illustrated in Figures 12 and 13, the opening of the tube 20a (Figure 12) being substantially in the shape of an inverted key-hole having a normally submerged portion 46a and a vertical extension 48a, and that of tube 20b (Figure 13) comprising a normally submerged opening 46b associated with a separate vertically elongated opening 48b. Still another form of tube opening for effecting distribution of the reflux liquid is shown in Figure 14, in which the tube 20c is provided with a main circular reflux opening 46c, adapted to be submerged in the pool of liquid on plate 22, together with vertically spaced circular openings 48c and 49 of progressively decreasing size, openings 48c and 49 being adapted to take care of abnormal accumulations of liquid on plate 22. By the use of reflux distributing means of these types on each of the many contact tubes of each contact section, a substantially uniform distribution of liquid into all of the tubes of a contact section may be continuously obtained, even though there might be differences of as much as one half inch in the level of the liquid held on tray 22. With the illustrated constructions a preponderant part of the liquid flow into each contact tube passes through an opening submerged below the level of the liquid pool, and a substantially uniform distribution of liquid into the many tubes of each contact section is obtained because the velocity and therefore the quantity of liquid flowing into the tubes are proportional to the square root of the head of the liquid above the submerged openings, instead of varying in direct proportion to variations in the level of the liquid.

The reflux openings of all contact tubes of a contact section preferably are made of the same size and shape and are located uniformly with respect to the surface plate 22, so that the liquid distribution is quite uniform so long as the head of liquid above the openings does not vary greatly. It is apparent, however, that many different sizes and shapes of openings can be used, while still obtaining uniform liquid distribution, when a uniform head of liquid prevails on the plate. Moreover, when a liquid side stream is being withdrawn from a tower chamber, a substantially definite liquid level gradient may exist near each side stream draw-off opening, and the reflux openings may be varied in design for any particular operating condition to give substantially uniform distribution of liquid into the contact tubes notwithstanding the existence of such a level gradient.

Referring again to Figures 4 and 7, it will be noted that the upper ends of the contact tubes 20 extend above the level of liquid on the plate 22 and are provided with caps 50 to prevent direct entrance into the tubes of liquid flowing downwardly from the tubes of an overlying contact section. Below caps 50, side openings 52 are provided near the ends of the tubes to allow the escape of rising vapors into the corresponding tower chamber from above the liquid level. These openings 52 are preferably formed with downwardly converging extensions such as the V-shaped portions 54, to distribute liquid uniformly into the tubes in case the tower chamber should become overloaded with reflux. They are made large enough to avoid an excessive pressure drop at any point in the tower.

Although Figures 4 and 7 show contact tubes constructed with internal splash baffles, it will be apparent that various other constructions may be employed for effecting an intimate contact between the small stream of rising vapors and the small stream of downflowing liquid which pass through each tube. As illustrated in Figure 14, the contact tubes may be of the packed column type, tube 20c in Figure 14 being provided with suitable packing material, such as Raschig rings 56. Other types of packing material may be employed. When packed contact tubes are used, or in other cases, the liquid entering each tube may flow onto a weir 58, from which it will overflow in fine streams onto the packing material 56 (Figure 14). A sealing plate 59 may extend into the pool of liquid on the weir 58 in order to prevent the vapors from blowing out through the liquid feed openings 46c, 48c, etc.

Referring again to Figure 1, the tower 10 is preferably provided with bubble decks 60 between the charge inlet 12 and the lowermost contact section 6, for the purpose of separating coke or other entrained matter from the rising vapors before they enter the contact tubes of section 6. Conventional baffles may be employed in place of the bubble decks 60, if desired.

An inlet 62 is provided for introducing a stream of reflux liquid into the top of the tower 10, together with distributing means 64 by which to distribute the liquid substantially uniformly onto the plate 22 of contact section 1. In the illustrated form, the distributing device 64 is constructed as a weir having serrated overflow lips 66, substantially as shown in Figures 2 and 3. The liquid from inlet 62 falls onto weir 64 in a plurality of streams, as indicated in Figure 1, so as to aid in uniform distribution of the liquid onto and from the distributing device. In the rectification of mineral oil, reflux liquid is introduced into the tower through inlet 62 in such manner as to maintain the desired vapor temperature near the top of the tower, the rate of flow, for example, being controlled by means of a temperature control 67 having its bulb 68 located in tower chamber 31.

It will be observed that the vertically spaced supporting plates 22 and 24 for the contact tubes of each contact section provide between themselves and the tower shell a number of spaces or compartments 71, 72, 73, 74, 75 and 76, each of these spaces enclosing the many contact tubes of a contact section. In accordance with my invention, these spaces or compartments are utilized for heat exchange with the external surfaces of the contact tubes, which are of such large surface area as to provide highly effective heating facilities for pre-heating charge stock, reboiling side streams or for other allied operations.

In the embodiment of Figure 1, the compartment 71 of contact section 1 is utilized for preheating the charge material for the rectification process. Oil is supplied into the upper part of compartment 71 through an inlet 80 by means of a pump 81, which may operate in conjunction with a flow controller 82. The oil entering compartment 71 is received on and held in contact with the external surfaces of the contact tubes 20 by suitable baffle plates 83. It flows from plate to plate and passes out of the heat exchange compartment through an outlet 84, thence passing through heat exchangers 85 and 86 and through pipe 87 into another heat exchange compartment 75 of the rectifying tower 10. In compartment 75 the oil is again brought into intimate contact with the external surfaces of contact tubes by means of baffles 88. Flowing from compartment 75 through pipe 89, it then passes through heat exchangers 90 and 91 and from the latter into the coils 92 of a heater 94, where the oil is heated and brought to the final temperature for introduction to the flash zone of the tower through inlet 12.

Liquid side streams are taken from any desired stage of the operation and are reboiled and stripped in a heat exchange compartment located below the point of withdrawal of the side stream. For example, a pipe 100 communicates by suitable branches 101 with plate 22 of contact section 2, so as to withdraw liquid from the pool maintained in tower chamber 31. The rate of side stream withdrawal may be controlled by a valve 102, which is preferably regulated by remote control means (not shown). Pipe 100 leads into the upper portion of heat exchange compartment 73 and delivers the side stream liquid, through suitable openings in an end portion 103, onto baffle plates 104 surrounding the contact tubes of contact section 3. The liquid is reboiled by heat exchange with the external surfaces of the contact tubes, which in turn abstract heat from the streams of rising vapors and down-flowing liquid passing through the tubes. Steam or other high vapor pressure material may be introduced into compartment 73 through inlets 105, this resulting in efficient stripping of light ends from the liquid side stream. The reboiled and stripped liquid accumulates in the bottom of compartment 73 and is withdrawn through branches 106 into pipe 107, by which it is passed through pump 108 and heat exchanger 85, to be recovered as a liquid intermediate product of improved quality. The level of liquid in the stripping compartment 73 may be controlled automatically by suitable liquid level control means 109. The vapors produced by the reboiling and stripping operations pass through risers 110 into tower chamber 32, where they mingle with the main stream of vapors in the chamber before entering the contact tubes of contact section 2.

As further illustrated in Figure 1, a second intermediate product of improved quality is produced by withdrawing a side stream from plate 22 of contact section 4 and reboiling and stripping the side stream in the heat exchange or stripping compartment 74 of the same contact section. The apparatus arrangement here involved may be similar to that previously described, including ducts 111 leading to pipe 112, valve 113, baffles 114, steam inlets 115, draw-off ducts 116, pipe 117, liquid level control 118 and risers 119. The stripped product produced in compartment 74 is withdrawn through pipe 116 and is recovered as a second liquid intermediate product of improved quality after passage through pump 120 and heat exchanger 86. The vapors produced by the operations in compartment 74 pass into the overlying tower chamber 33 through the risers 119.

A third liquid intermediate product of improved quality is produced in the illustrated embodiment by withdrawing a side stream from plate 22 of contact section 5, into pipe 122, and introducing the side stream liquid into a heat exchange compartment 75 of contact section 6, where the side stream liquid is reboiled and stripped as in the case of compartments 73 and 74. The stripped product is withdrawn from compartment 75 through a line 123 and is recovered as an intermediate product of improved quality after passage through pump 124 and heat exchanger 90.

The operation of the installation, as illustrated schematically in Figure 1, may be briefly summarized as follows: Charge material, preheated and brought to the boiling point as previously described, is introduced into the flash zone of the tower at 12. Unvaporized material enters a sump at the bottom of the tower after passing over an entrainment separator 69. The vapors rise through decks 60, become distributed among the contact tubes of section 6 and pass successively through section 6, chamber 35, section 5, chamber 34, section 4, chamber 33, section 3, chamber 32, section 2, chamber 31 and section 1. Reflux liquid is introduced into the tower at 62 and distributed into the contact tubes of section 1 from plate 22 of section 1. Liquid passes downwardly through section 1, chamber 31, section 2, chamber 32, section 3, chamber 33, section 4, chamber 34, section 5, chamber 35, section 6, and decks 60. The small liquid streams passing downwardly through the tubes of each contact section flow in intimate contact with and countercurrent to small streams of the rising vapors. A high temperature is maintained in the flash zone of the tower, and this gradually decreases from the flash zone to the top of the tower. The higher boiling fractions of the rising vapors condense in contact with down-flowing reflux and flow back down the tower as internal reflux, while the low boiling fractions of the reflux liquid become vaporized as the reflux descends in the tower and ascend back up the tower with the rising vapors. The low boiling vapors which reach the top of the tower are withdrawn through outlet 14 and pass through a condenser 130 and into a storage tank 131. A portion of the condensate is returned to the top of the tower as external reflux, by means of a pump 132 and a conduit 133 connected with the liquid inlet 62. The rest of the condensate passes through a conduit 134 and is recovered as the top product, the quantity so recovered being governed by a valve 135 controlled by a liquid level control 136 on tank 131. The temperature control 67 governs the rate of flow through the liquid inlet 62 according to pre-selected temperature conditions, thereby maintaining the desired temperature and composition conditions at the top of the tower. Liquid side streams are withdrawn from the pools in chambers 31, 33 and 34 and are reboiled and stripped in compartments 73, 74 and 75, respectively, as already described. Induced reflux is formed by these operations and by the previously described heat exchange operations which take place in compartments 71 and 75. Unvaporized charge material or other high boiling liquid reaching the bottom of the tower is withdrawn through outlet 16 by means of a pump 140, whence it passes through heat exchanger 91 and is recovered as the bottom product. The rate of withdrawal of the bottom product is governed automatically by a liquid level control 141.

The present invention not only provides an efficient and flexible system for carrying out the main rectification process and other allied operations in a single distillation unit, but it also provides an apparatus of comparatively simple construction which can be built much smaller and at much less cost than in the case of a conventional bubble tower of equivalent working capacity. For example, the tower shell of the new construction may have an internal diameter of five feet (5′), the contact tubes 20 of each contact section may be cylindrical, with an internal diameter of four inches (4″), and about sixty-eight (68) contact tubes may be included in each contact section, the tubes being arranged on centers spaced six inches (6″) apart. There may be, for example, about nineteen splash baffles in each tube, arranged on two and one-half inch (2½″) centers. In such an arrangement each splash baffle will have a fractionating efficiency of about 25%, more or less; hence less than eleven inches (11″) of contact tube height will produce the effect of one redistillation on the composition of the rising vapors. Contact tubes equipped with splash baffles may readily have a free area equivalent to about 45% of their total cross-sectional area, so that the assembly will provide free area for the passage of rising vapors amounting to about 13.5% of the cross-sectional area of the tower shell. Obviously, such a tower construction may be very much smaller in height than a conventional bubble tower, while still performing an equivalent or greater amount of work, and its diameter also may be considerably smaller in many cases. These specific figures, of course, are mentioned only as an indication of what may be accomplished, since the dimensions of the tower parts and other conditions of construction and operation are susceptible to wide variation.

The new type of apparatus herein disclosed is susceptible to embodiment in many different forms and details of construction, of which a few examples have already been mentioned. Where it is desired to decrease the tower diameter by arranging the contact tubes closely together, while still obtaining uniform distribution of liquid into the contact tubes, a construction such as illustrated in Figure 9 may be found advantageous. Here the upper plate $22d$ of one contact section is separated from the tubes $20d$ and the lower plate $24d$ of an overlying contact section by means of a deck or partition $150$. Liquid flowing from the tubes of the upper section collects in a pool on deck $150$, whence it is distributed substantially uniformly among the tubes $20d$ of the lower section by means of feed tubes $152$, one for each contact tube. The lower ends of feed tubes $152$ dip into the liquid held on the topmost baffles of the contact tubes $20d$. Their upper ends project through deck $150$ to points above the level of the liquid pool thereon. Partly submerged openings $46d$, near the upper ends of the feed tubes, effect the liquid distribution. Vapors rising from tubes $20d$ pass into chamber $30d$ and thence through risers $154$ which open into chamber $31d$ above the level of liquid on deck $150$. In such an arrangement the reflux feed tubes are of smaller diameter than the contact tubes and are spaced farther apart, so that satisfactory distribution of liquid is obtained even though no space be provided between the contact tubes. This arrangement gives a free area greatly in excess of 13.5% and permits a corresponding decrease in tower diameter. When the contact tubes are triangular, square or hexagonal in cross section they can be placed immediately adjacent to each other, and part of plate $22d$ can be eliminated.

Figures 10 and 11 illustrate another feature of construction which may be used to advantage where a liquid side stream is to be withdrawn from a tower chamber. Branch pipes $101a$ open into the feed plate $22$ of a contact section at a number of points which are spaced apart in such manner as to draw liquid substantially uniformly from the entire area of the plate. The pipes $101a$ extend parallel to the contact tubes $20$, to a point below the lower ends of the tubes where they connect with a main outlet pipe $100a$. This construction minimizes the tendency of the side stream withdrawal to cause a liquid level gradient and thus minimizes variations in the distribution of residual liquid into the contact tubes.

Although I have described my invention particularly, as embodied in an atmospheric distillation unit for the rectification of mineral oil, it will be apparent to those skilled in the art that the invention can be used to advantage in a great variety of rectification, absorption or gas scrubbing processes, whether operated at atmospheric pressure or at elevated pressures or under vacuum. In absorption processes, for example, it is important to obtain good contact between vapors and liquid and to remove the latent heat of the vapors as they are absorbed so as to maintain the temperatures required for efficient operation. These functions are served effectively by the new features herein disclosed.

It will also be apparent that the present invention may be embodied in various designs of apparatus, without restriction to the details of construction or design which have been mentioned as parts of the illustrated embodiments. I therefore desire that the invention be accorded a scope fully commensurate with its novel contributions to art, as limited only by the requirements of the appended claims.

I claim:

1. The method of contacting vapors and liquids in processes of rectification, absorption and gas scrubbing which comprises providing a main stream of rising vapors in a lower portion of a contact tower, providing a pool of down-flowing liquid in an upper portion of the tower, repeatedly distributing the rising vapors into a multiplicity of separate small streams and combining the small streams into a common body of vapors and co-mingling the same after each stage of distribution, repeatedly distributing the down-flowing liquid into a multiplicity of separate small streams and after each stage of distribution combining the small streams into a common body of liquid contacting one of said bodies of vapor passing each of the many small streams of rising vapors in intimate countercurrent contact with one of the many small streams of down-flowing liquid at each stage of distribution so as to effect the scrubbing or fractionation thereof, withdrawing a liquid side stream from at least one of said bodies of liquid, and exchanging heat between said side stream and said countercurrently contacting streams of vapors and liquid at at least one of said many stages of distribution.

2. The method of rectifying volatile mixtures to produce a purified low boiling product, a high boiling liquid product and an intermediate product which comprises introducing a stream of the mixture into a contact tower and vaporizing the same to produce a main stream of rising vapors in a lower portion of the tower, providing a pool of reflux liquid in an upper portion of the tower, maintaining an increasing temperture gradient from the top to the bottom of the tower, repeatedly distributing the rising vapors into a multiplicity of separate small streams, combining and co-mingling the small vapor streams after each stage of distribution, repeatedly distributing the reflux liquid into a multiplicity of separate small down-flowing streams, combining the small liquid streams into a pool after each stage of distribution, passing each of the many small streams of rising vapors in intimate countercurrent contact with one of the many small streams of reflux liquid at each stage of distribution so as to effect the fractionation thereof, distributing said small liquid streams from said pools predominantly through openings submerged in the liquid of the respective pools, withdrawing a side stream in the liquid phase from at least one of said pools to obtain therefrom an intermediate product, withdrawing purified vapors of a low boiling product from the top of the tower and withdrawing a high boiling liquid product from the bottom of the tower.

3. The method of rectifying volatile mixtures to produce a purified low boiling product and a high boiling liquid product which comprises introducing a stream of the charge mixture into a contact tower and vaporizing the same to produce a main stream of rising vapors in a lower portion of the tower, providing a main stream of reflux liquid in an upper portion of the tower, maintaining an increasing temperature gradient from the top to the bottom of the tower, repeatedly distributing the rising vapors into a multiplicity of separate substantially uniform small streams, combining and co-mingling the small vapor streams after each stage of distribution, repeatedly distributing the reflux liquid into a multiplicity of separate substantially uniform small down-flowing streams, combining the small liquid streams into a pool after each stage of distribution, passing each of the many small streams of rising vapors in intimate countercurrent contact with one of the many small streams of reflux liquid at each stage of distribution so as to effect the fractionation thereof, distributing said small reflux streams from each of said pools predominantly through openings submerged in the liquid of the respective pool, preheating the charge mixture before introducing the same as aforesaid by passing the same in heat exchange relation to the many countercurrently contacting streams of vapors and reflux liquid at at least one of said stages of distribution, withdrawing purified vapors of a low boiling product from the top of the tower and withdrawing a high boiling liquid product from the bottom of the tower.

4. The method of rectifying volatile mixtures to produce a purified low boiling product, a high boiling liquid product and one or more liquid intermediate products, which comprises introducing a stream of the charge mixture into a contact tower and vaporizing the same to produce a main stream of rising vapors in a lower portion of the tower, providing a main stream of reflux liquid in an upper portion of the tower, maintaining an increasing temperature gradient from the upper portion to the lower portion of the tower, repeatedly distributing the rising vapors into a multiplicity of separate small streams, combining and co-mingling the small vapor streams after each stage of distribution, repeatedly distributing the reflux liquid into a multiplicity of separate small down-flowing streams, combining the small liquid streams after each stage of distribution, passing each of the many small streams of rising vapors in intimate countercurrent contact with one of the many small streams of reflux liquid at each stage of distribution so as to effect the fractionation thereof, maintaining a substantial pool of reflux liquid adjacent each stage from which to distribute said small reflux streams, withdrawing a liquid side stream from at least one of said pools and reboiling each side stream in heat exchange relation to the many countercurrently contacting streams of vapors and reflux liquid at a stage of distribution below the point of withdrawal, to produce a desired intermediate product, withdrawing purified vapors of a low boiling product from the top of the tower, condensing said purified vapors and returning part of the condensate into the tower as the aforesaid main stream of reflux liquid, and withdrawing a high boiling liquid product from the bottom of the tower.

5. Vapor and liquid contact apparatus for rectification, absorption or gas scrubbing comprising an upright contact tower, a plurality of vapor and liquid contact sections arranged in vertically aligned and spaced relation between the top and bottom of said tower, tower chambers above and below each contact section, each of said contact sections comprising a multiplicity of elongated vertically disposed contact tubes communicating in common adjacent their upper and lower ends, respectively, with the tower chambers above and below the corresponding section to convey rising vapors and down-flowing liquid from chamber to chamber in a multiplicity of small countercurrent streams, means enclosed within each contact tube between adjacent tower chambers for effecting intimate contact between the streams of vapors and liquid passing countercurrently through each tube, means for holding a pool of liquid in communication with and below the vapor outlets of the contact tubes of each contact section, means on an extension of each tube and below the vapor outlets of the corresponding section for distributing down-flowing liquid from each of said pools substantially uniformly into the contact tubes of the corresponding contact section, means for supplying a main stream of rising vapors to the contact tubes of the lowermost contact section, means for supplying a main stream of liquid to the pool communicating with the contact tubes of the uppermost section, means for withdrawing vapor from the top of the tower, and means for withdrawing liquid from the bottom of the tower.

6. Vapor and liquid contact apparatus for rectification, absorption or gas scrubbing comprising an upright tower shell, a plurality of superimposed vapor and liquid contact sections between the top and bottom of the tower, tower chambers within the shell above and below each contact section, each of said contact sections comprising a mutiplicity of elongated, parallel vertically disposed contact tubes communicating in common at their upper and lower ends with the tower chambers adjacent the same section, whereby to convey rising vapors and down-flowing liquid from chamber to chamber in a multiplicity of small counter-current streams, means within and supported by each contact tube for effecting intimate contact between streams of vapor and liquid passing countercurrently therethrough, means for supplying liquid into the tower above the uppermost contact section, means for maintaining a pool of liquid in a tower chamber in communication with each contact section, means individual to each contact tube for distributing down-flowing liquid from each of said pools substantially uniformly into the many contact tubes of each contact section, vertically spaced partitions extending across the tower shell intermediate the ends of the contact tubes of at least one of said contact section, said partitions forming with the shell a tower compartment separated from the tower chambers adjacent said section, means for introducing liquid into said compartment for heat exchange with external surfaces of said contact tubes, and means for withdrawing liquid from said compartment.

7. Vapor and liquid contact apparatus for rectification, absorption or gas scrubbing comprising an upright tower shell, means for supplying rising vapors to a lower portion of the shell, means for supplying liquid to an upper portion of the shell, alternate tower chambers and tower compartments disposed in superimposed relation within the shell between said upper and lower portions and separated each from the other by intervening transverse partitions, a plurality of contact sections each including a multiplicity of parallel vapor and liquid contact tubes extending vertically through one of said tower compartments in sealed relation to the respective partitions and opening at their upper and lower ends into the tower chambers above and below the respective compartment, whereby to convey rising vapors and down-flowing liquid from chamber to chamber in a multiplicity of small countercurrently contacting streams, means near the upper ends of the tubes of each section for maintaining a pool of liquid below such ends in the lower chamber adjacent thereto and for distributing down-flowing liquid from the pool substantially uniformly into the many tubes, means for venting rising vapors from the said tubes into the corresponding tower chamber above the level of said liquid pool, means for introducing liquid into said compartments for heat exchange with external surfaces of the tubes extending therethrough, and means for withdrawing liquid from said compartments.

8. Vapor and liquid contact apparatus for rectification or the like comprising an upright tower shell, means for supplying vapors of the mixture to be rectified to a lower portion of the shell, means for supplying reflux liquid to an upper portion of the shell, alternate tower chambers and tower compartments separated each from the other and disposed in superimposed relation within the shell between said upper and lower portions, a plurality of contact sections each including a multiplicity of parallel vapor and reflux contact tubes extending vertically through one of said tower compartments and opening at their upper and lower ends into the tower chambers above and below the respective compartment, whereby to convey rising vapors and down-flowing reflux from chamber to chamber in a multiplicity of small countercurrently contacting streams, means near the upper ends of the tubes of each contact section for maintaining a pool of reflux in the tower chamber adjacent thereto and for distributing reflux from the pool substantially uniformly into the many tubes, means for venting rising vapors from the upper ends of the tubes of each section into the corresponding tower chamber above the level of the liquid pool therein, means communicating with some of said chambers and with some of said compartments for withdrawing liquid side streams from said liquid pools and introducing the same into said compartments to strip the side streams by heat exchange with the contact tubes extending through the respective compartments, means for withdrawing said stripped side streams from said compartments as liquid intermediate products, means for venting vapors stripped from said side streams into tower chambers above the respective compartments, means for withdrawing low boiling vapors from the top of the tower shell, and means for withdrawing high boiling liquid from the bottom of the tower shell.

9. In an apparatus for countercurrently contacting rising vapors and down-flowing liquid, an upright tower shell and a vapor and liquid contact section intermediate the ends of said shell, such contact section having a liquid feed plate extending across the shell to receive down-flowing liquid and a multiplicity of spaced parallel tubes extending vertically through said plate and sealed thereto, said contact tubes having substantially similar vertically-extending reflux passages in the side walls thereof spaced substantially equally above said plate and dimensioned to hold a substantial pool of liquid on the plate and to remain at least largely submerged in said pool, whereby to distribute down-flowing liquid from the pool into the tubes predominantly through submerged openings, outlets for rising vapors adjacent the upper ends of said tubes and spaced above said reflux openings and sealing means within said tubes adjacent said reflux passages to prevent the blowing of rising vapors therethrough.

10. In an apparatus for countercurrently contacting rising vapors and down-flowing liquid, an upright tower shell and a vapor and liquid contact section intermediate the ends of said shell, each contact section including a liquid feed plate extending across the shell to receive down-flowing liquid and a multiplicity of parallel contact tubes extending vertically through said plate and sealed thereto, said contact tubes having side openings above said plate so shaped and dimensioned in relation to the flow of down-flowing liquid as to hold a substantial pool of liquid on the plate and to remain at least partly submerged in said pool, whereby to distribute accumulating liquid from the pool into the many tubes through said submerged openings in substantially uniform small streams, said tubes having vapor outlet openings above said side openings, means enclosed within each of said tubes for effecting repeated intimate contact between small streams of liquid and vapor passing countercurrently therethrough and means inside of said tubes adjacent said side openings to form a liquid seal preventing the passage of vapor through said side openings.

11. In an apparatus for continuously contacting rising vapors and downflowing liquid, an upright tower shell and a vapor and liquid contact section intermediate the ends of said shell, such contact section comprising a supporting plate extending across said shell and a multiplicity of parallel contact tubes extending vertically with respect to said plate in sealed relation thereto, said tubes opening into common tower chambers at their upper and lower ends and each tube having means enclosed therein for effecting intimate contact between streams of liquid and vapor passing countercurrently therethrough, a liquid feed plate extending across said upper tower chamber in vertically spaced relation to the upper extremities of said contact tubes, a multiplicity of liquid feed tubes, each extending downwardly through said feed plate to a point inside one of said contact tubes, the upper ends of said feed tubes projecting above said feed plate and having side openings therein dimensioned to hold a substantial pool of liquid on the plate and to remain at least partly submerged in said pool whereby to distribute the liquid substantially uniformly into the respective tubes, and vapor risers in said feed plate opening into the space thereabove at points above said distributing openings.

12. In an apparatus for countercurrently contacting vapors and liquid, an elongated vertical contact tube several inches in diameter open at its upper and lower ends for the passage of rising vapors therethrough and having a cap on its upper end to prevent the entrance of down-flowing vertically-extended liquid directly thereinto, a liquid feed passage in the side wall of said tube near but below its upper end for admitting a small stream of liquid into the tube from a pool at least partly submerging said passage, means between said feed passage and the lower end of said tube for effecting repeated intimate contact between streams of liquid and vapor passing countercurrently therethrough, a weir within said tube to receive liquid form said passage and pass the same on to said contact means, and sealing means arranged to extend into liquid on said weir to prevent the flowing of rising vapors through said passage.

13. Apparatus as described in claim 12, said contact means comprising a series of vertically spaced overlapping splash baffles each adapted to hold a small pool of liquid thereon and to cascade down-flowing liquid from baffle to baffle.

14. Apparatus as described in claim 12, said liquid feed passage comprising a vertically elongated portion and a lower portion of greater width than the vertically elongated portion.

15. In an apparatus for countercurrently contacting rising vapors and down-flowing liquid, an upright tower shell and a vapor and liquid contact section intermediate the ends of said shell, said contact section including a liquid feed plate extending across the shell to receive down-flowing liquid and a multiplicity of parallel contact tubes extending vertically through said plate and sealed thereto, said contact tubes having side openings above said plate so shaped and dimensioned in relation to the flow of down-flowing liquid as to hold a substantial pool of liquid on the plate and to remain largely submerged in said pool, whereby to distribute accumulated liquid from the pool into the many tubes through such submerged openings in substantially uniform small streams, said tubes having vapor outlet openings above said side openings, and means comprising vertically spaced, staggered, overlapping baffles enclosed within each of said tubes between the extremities thereof for effecting repeated intimate contact between small streams of liquid and vapor passing countercurrently therethrough.

MERLE A. ZIMMERMAN.

CERTIFICATE OF CORRECTION.

Patent No. 2,253,925. August 26, 1941.

MERLE A. ZIMMERMAN.

It is hereby certified that error appears in the printed specification of the above numbered patent requiring correction as follows: Page 6, second column, line 28, claim 1, after "vapor" insert a comma; line 37, same claim, strike out the word "many" and insert the same after "said" in line 36; page 8, first column, line 14, claim 7, for "lower" read --tower--; same page, second column, line 72, claim 12, strike out "vertically-extended" and insert the same before "liquid" in line 73, same claim; page 9, first column, line 6, claim 12, for "form" read --from--; and that the said Letters Patent should be read with this correction therein that the same may conform to the record of the case in the Patent Office.

Signed and sealed this 7th day of October, A. D. 1941.

(Seal)

Henry Van Arsdale,
Acting Commissioner of Patents.